Jan. 17, 1933.　　　N. B. SIMPSON　　　1,894,546
VALVE
Original Filed Oct. 26, 1929
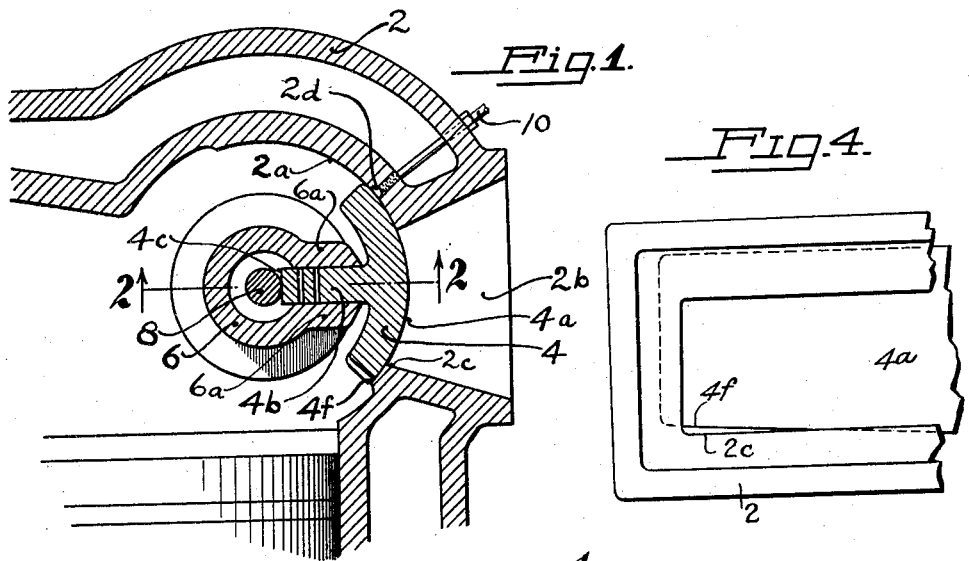
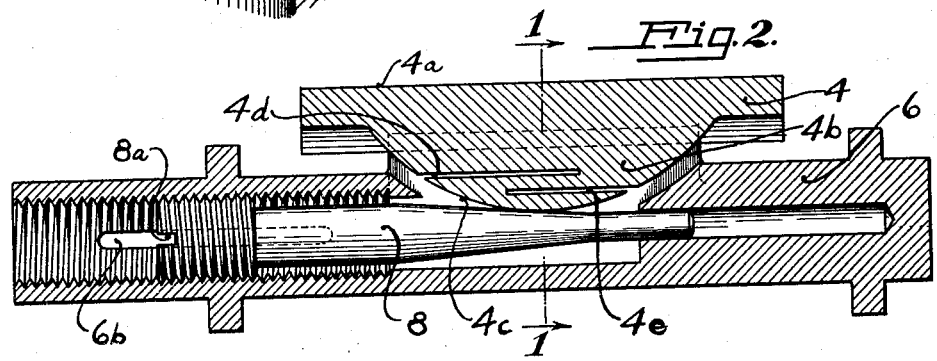
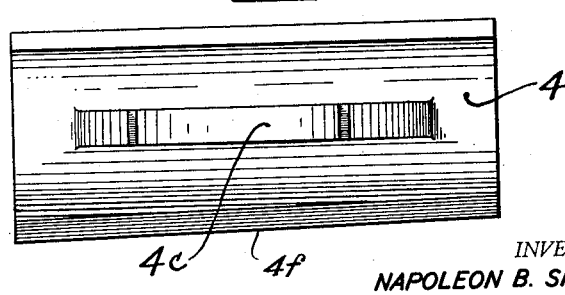
INVENTOR,
NAPOLEON B. SIMPSON.
BY Eugene Jacobson
ATTORNEY.

Patented Jan. 17, 1933

1,894,546

UNITED STATES PATENT OFFICE

NAPOLEON B. SIMPSON, OF SAN FRANCISCO, CALIFORNIA, ASSIGNOR TO SIMPSON MOTOR CORPORATION, OF SAN FRANCISCO, CALIFORNIA, A CORPORATION OF CALIFORNIA

VALVE

Application filed October 26, 1929, Serial No. 402,684. Renewed July 5, 1932.

My invention relates to valves, especially to engine valves and particularly to valves for internal combustion engines. My invention is especially applicable to and will be described as embodied in a valve, of oscillating rotary type, which slides upon its seat.

The present invention is an improvement upon my prior Patent Number 1,075,163 of October 7, 1913. Its objects are to provide means for taking up clearance caused by wear or regrinding of the valve, to compensate for slight inaccuracies in its construction or heat-distortion in its operation, and to maintain a most effective seal against valve leakage without undue pressure or friction between valve and seat. It is further an object of my invention to provide adjustability in a valve of the type described in my said prior patent, to provide that adjustability simply and economically, and to provide an adjusting means which will best withstand the conditions of service to which such valves are exposed. It is an object of my invention to provide a valve which may readily and simply be adjusted without requiring any substantial disassembly of the valve or of the engine to which it is applied. It is a further object of my invention to provide a valve which will slide across its port without clicking, chattering, binding, gouging, or jamming. It is an object of my invention to provide a valve with compensating means for resolving slight inaccuracies in construction or assembly, or expansion, distortion or wear in service. My invention aims to provide a generally improved structure in both detail and assembly, for the uses and purposes set forth. Other and ancillary objects of my invention will be suggested in the following description and in the use of the device of my invention.

Referring to the drawing:

Figure 1 is an approximately median transverse section of the valve assembly with the closure member in closed position upon its seat. The plane of section is indicated by a line 1—1 in Fig. 2.

Figure 2 is a longitudinal section of the assembled valve apart from its seat. The plane of section is taken through the axis of symmetry, and is indicated by a line 2—2 in Fig. 1.

Figure 3 is a bottom plan detail of the valve closure member.

Fig. 4 is a fragmentary face view of the valve port showing the valve almost, but not quite closed.

The valve assembly of my invention consists essentially of a housing member 2, a valve closure member 4, a valve shaft member 6, and an adjusting member 8.

The valve housing member 2 in this instance is constituted by an integral ridgelike pocket-forming hump in the cylinder head of the internal combustion engine to which my improved valve is applied. The housing encloses a valve chamber of generally segmental cylindrical shape bored to an accurate segmental cylindrical valve seating surface 2a. A rectangular valve port 2b leading from the housing, is bounded by the valve seat 2a.

The valve closure member 4 is arranged to slide back and forth circumferentially of the valve seat to open and close the port 2b. The face portion 4a of the valve closure member is an annular segment large enough to cover the port 2b and having its outer or face surface finished accurately to the same radius of curvature as the seat 2a.

A valve stem is constituted by a tall integral radially directed longitudinal rib 4b on the concave side of the closure member. This stem acts as a key in transmitting rotation from the valve shaft to the closure member; its broad side faces being planed parallel to fit a driving slot of the valve shaft member next to be described.

The valve shaft member 6 is a generally circular shaft journaled in the housing 2 exactly in line with the axis of its cylindrical surface 2a. As in my prior Patent 1,075,163, antifriction bearings (not shown herein) for the shaft are preferably provided in the housing. A radially directed longitudinal driving slot is formed in the shaft to receive the valve stem 4b with a close sliding fit. The faces of the slot are heightened and reinforced by longitudinal shoulders 6a, 6a, projecting up from the otherwise circular shaft on either side of the slot. The stem 4b is constrained by the slot to rotate with the shaft, but can be moved therein radially of the shaft.

Means including an adjusting member 8 are provided for moving the valve stem radially of the shaft to adjust clearance of the closure member upon its seat. The adjusting member 8 is a taper pin with small diameter and large diameter ends untapered for a distance sufficient to guide axial movement of the pin, and with its large diameter end threaded. A screw-driver slot 8a is formed across the large diameter end of the pin. The adjusting pin 8 is intended to extend and be adjustable axially within the shaft 6, and to that end, the shaft is drilled axially throughout a major portion of its length to fit the large end of the adjusting pin, and to a slightly greater depth to fit the small end of the adjusting pin. The outer end of the hole is tapped to take the threaded end of the pin 8, and both diameter portions of the hole are sufficiently long to permit axial adjustment of the pin.

When assembled, the end of the valve stem projects down into the hollow part of the shaft and bears against the tapered portion of the adjusting pin 8 therein. When the adjusting pin is retracted to present a smaller diameter portion of its taper surface to the stem end, the valve closure member 4 is free to move away from its seat; and conversely when the adjusting pin is screwed further into the shaft the closure member is forced against its seat to take up clearance therebetween.

A keyway 6b is shown near the end of the shaft 6 to accommodate a suitable driving connection for oscillating the shaft. The keyway 6b is preferably formed at the threaded portion of the shaft so that the driving key therefor may enter the slot 8a in the pin 8 to perform the added function of locking the pin in adjusted position.

The valve stem 4b, instead of presenting a plane bearing surface against the pin 8, has its bearing end 4c curved longitudinally to form a rocker. The valve is thereby enabled to adapt itself pivotally at right angles to its direction of oscillation. It will be observed that the valve is in effect mounted upon a universal joint; being driven about the axis of the valve shaft and being free to rock in a perpendicular direction on the rocker 4c. This feature allows the closure member to adapt itself to irregularities such as misalignment of the valve shaft or seat.

Staggered slits are cut at 4d and 4e preferably in the stem 4b to interpose a yieldable connection between the valve shaft and face. The planes of the slits are parallel to each other and to the axis of the shaft 6, are spaced from each other in a direction radial to that axis, and the slits are staggered in a direction longitudinally of it. The staggered slits allow the valve to bear against its seat in spite of slight inaccuracies in machining of parts or their distortion in service. The slits allow for expansion due to heat, allow tolerance for slight overadjustment of the valve, and also tend somewhat to compensate for wear between periods of adjustment of the valve.

As the valve closure member of a valve slides across the port in closing there might be a tendency for the leading edge of its face (in the direction of closing) to catch on the closing or last-covered port edge of the seat, and especially so in event of warping or other slight imperfection of the valve assembly. In my improved valve that liability is avoided (see Fig. 12) by forming the edge 4f of the valve at a slight angle to the edge 2c of the port, or in more technical language, by forming the leading linear face edge 4f of the closure member face 4a on a slight slant relative to the linear port-closing edge 2c of the valve seat surface; so that as the valve closes, these two edges will gradually slide by each other as two intersecting lines instead of meeting squarely as two parallel lines.

It will be noted that the valve seat projects slightly above the surface of the valve chamber, and its extent is such that the valve never overrides its seat, i. e., the seat is carried just to the limits of motion of the valve. Thus a tendency for the valve to wear a groove into the seat, or of the seat to wear a groove into the valve, is avoided.

Means are provided for supplying the valve with a sealing and lubricating film of oil. As the valve slides back and forth around its seat a long narrow segment of the seat adjacent to the port is never uncovered by the valve face. An oil groove 2d is formed along that segment in the seat. An oil pipe 10 leads to the groove 2d and may be supplied with lubricant from the pressure lubricating system of the engine or by other suitable means.

I have described one embodiment of my invention in detail, but it is emphasized that this embodiment is illustrative and not inclusive of all the forms my invention may assume. Certain of the objects or certain portions or combinations of the objects of my invention may be attained with the use of less than all its advantageous features or with modifications within its purview. It is petitioned that my invention be limited only by the claims constituting its final determination.

I claim:

1. In combination, a valve seat, an oscillating valve, bearing means for resisting motion of the valve from said seat, and positive adjusting means between said valve and bearing for adjusting said valve toward said seat.

2. In a rotary valve, a hollow shaft, a valve closure member keyed to said shaft, and means for adjusting said closure member radially of said shaft including a taper pin within said shaft and means for moving said taper pin axially of the shaft.

3. A hollow drive shaft having a driving keyway therein, and an adjusting screw within said shaft having a transverse cut formed therein adjacent to said keyway, whereby said adjusting screw can be locked and said shaft driven by a single key in said keyway.

4. A valve assembly comprising a housing having a segmental cylindrical seat, a shaft journaled axially of the seat in said housing, a valve closure member mounted for rotation with said shaft and having a valve face in arcuate sliding contact with said seat; said closure member being free to rock longitudinally on said shaft whereby to compensate for possible inaccuracies of shaft alignment and the like, adjusting means for moving said closure member generally radially of said shaft, and yieldable means between said closure member and shaft to compensate for possible slight inaccuracies of adjustment and alignment of the closure member.

5. In combination, a rotary valve, means for rotating said valve about its axis, and means providing a pivotal support for the valve to permit the latter to rock in the plane of its axis to accommodate the valve to its seat.

6. In combination, a valve seat having a port therein, a valve slidable upon said seat to open and close said port, and positive adjusting means for moving said valve toward said seat to take up clearance therebetween.

7. In combination, a valve seat having a port therein, a valve slidable upon said seat to open and close said port, yieldable means for preventing jamming between said valve and seat, and adjusting means for moving said valve toward said seat to take up clearance therebetween; said adjusting means being distinct from said yieldable means.

8. In combination, a valve seat having a port therein, a valve slidable on said seat to open and close said port, resilient means for preventing jamming between said valve and seat and adjusting means for compressing said yieldable means to force said valve against said seat.

9. In combination, a valve seat having a port therein, a valve slidable upon said seat to open and close said port, positive adjusting means for moving said valve toward said seat, and yieldable means for preventing jamming between said valve and seat.

10. A valve structure comprising a shaft, means for rotating the shaft about its axis, and a valve carried by the shaft and having a rocker support with relation to the shaft to compensate for any disalignment between the shaft and the valve seat.

11. In combination, a valve seat having a port formed therein, a shaft journaled substantially parallel to said seat, a valve carried by the shaft and engageable with the seat, and a rocker connection between the shaft and valve to compensate for any disalignment between the shaft and the valve seat.

12. In a valve structure of the character described, a housing having a valve seat, a hollow shaft in said housing having a slot, a valve engageable with the seat, a web on said valve projecting into the slotted portion of the shaft, said web being rounded to form a rocker support for the valve, and adjustable means within the shaft forming a support for the rocker and also adapted to move the valve radially with relation to the shaft into engagement with the valve seat.

NAPOLEON B. SIMPSON.